Oct. 28, 1958    E. J. McCLOSKEY    2,857,771
ADJUSTABLE SHEAVES
Filed May 29, 1956    2 Sheets-Sheet 1
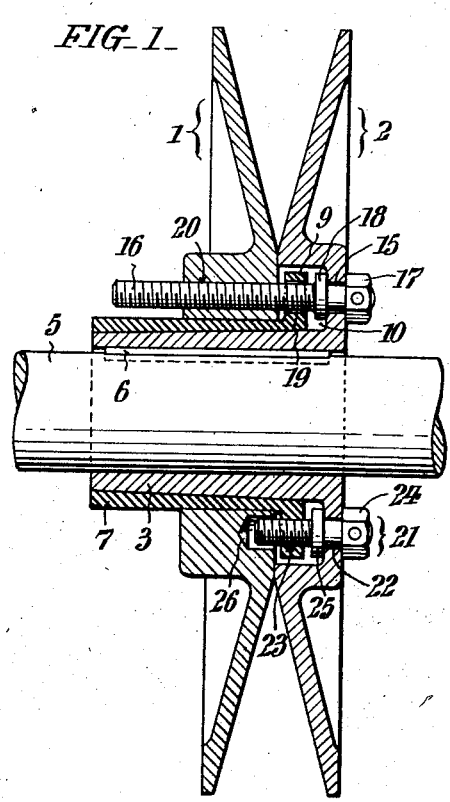
FIG_1_
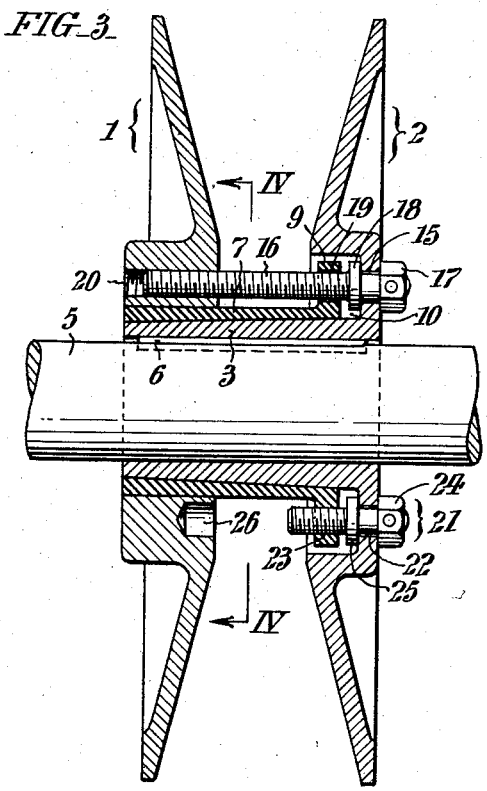
FIG_3_
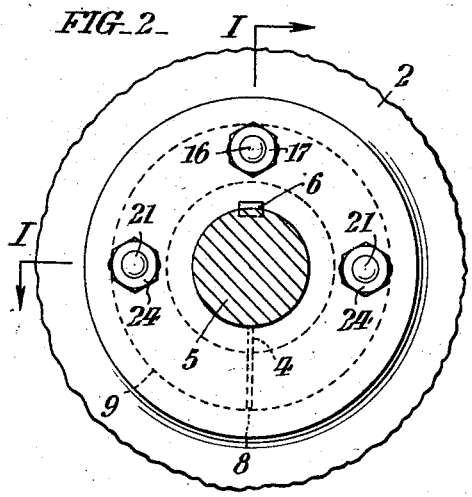
FIG_2_
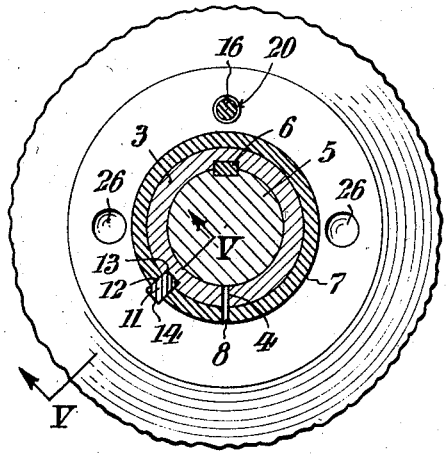
FIG_4_
INVENTOR:
Ellsworth J. McCloskey,
BY Paul & Paul
ATTORNEYS Oct. 28, 1958   E. J. McCLOSKEY   2,857,771
ADJUSTABLE SHEAVES
Filed May 29, 1956   2 Sheets-Sheet 2
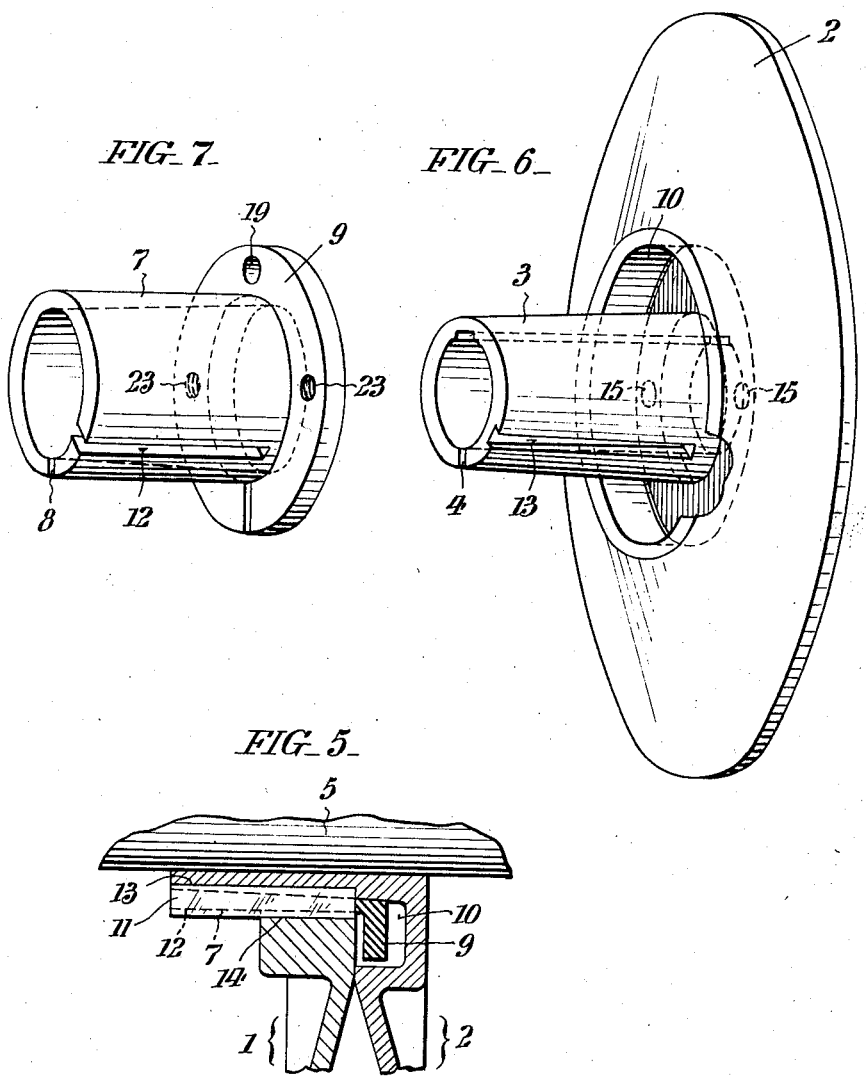

United States Patent Office 2,857,771
Patented Oct. 28, 1958

2,857,771
ADJUSTABLE SHEAVES

Ellsworth J. McCloskey, Norristown, Pa., assignor to The American Pulley Company, Philadelphia, Pa., a corporation of Pennsylvania Application May 29, 1956, Serial No. 588,086

5 Claims. (Cl. 74—230.17)

This invention relates to adjustable sheaves.

In connection with such sheaves, I aim to secure the advantages of greater structural simplicity and compactness, greater ease of adjustment, and immunity against displacement of the belt engaging disk components from adjusted positions during operation of the sheaves.

How the foregoing and other important objectives are realized in practice will appear from the following detailed description of the attached drawings, wherein:

Fig. 1 is a view in axial section of an adjustable sheave conveniently embodying my invention, the section being taken as indicated by the angled arrows I—I in Fig. 2.

Fig. 2 is a fragmentary view in side elevation as seen when looking from the right of Fig. 1.

Fig. 3 is a view similar to Fig. 1 showing the flange disks of the sheave differently adjusted.

Fig. 4 is a fragmentary view in cross section taken as indicated by the angled arrows IV—IV in Fig. 3.

Fig. 5 is a detail sectional view taken as indicated by the angled arrows V—V in Fig. 4.

Figs. 6 and 7 are perspective views of two component parts of the sheave, hereinafter more particularly referred to.

From these illustrations it will be noted that my improved sheave comprises a pair of opposingly beveled belt engaging disk components 1 and 2 whereof the latter has an elongate hub 3 extending from its beveled side, said hub being longitudinally split as at 4 in Figs. 4 and 6 and bored to fit the shaft 5 whereon the sheave is mounted. Rotation of the disk component 2 relative to the shaft 5 is prevented by a key indicated at 6. As shown, the outer surface of the hub 3 of the component 2 is tapered; and surrounding the hub is a sleeve 7 which is longitudinally split as at 8 (see Fig. 7) and which is taperingly bored to fit over said hub. The outer surface of the sleeve 7 is cylindrical, and the disk component 1 is axially bored to fit over it. At one end, the sleeve 7 is provided with a circumferential flange 9, and the disk component 2 is formed with an annular recess 10 to accommodate said flange in the assembled sheave as in Figs. 1 and 3. Relative rotation between the disk components 1, 2 and the sleeve 7 is prevented by a spline 11, see Figs. 4 and 5, the spline being lodged in a slot 12 in the sleeve 7 (Fig. 7) and engaging registering key ways 13 and 14 respectively in the hub 3 of the disk component 2 and in the bore of the disk component 1.

Passed freely through an aperture 15 in the disk component 2 (Figs. 1 and 3) is an adjusting screw 16 which is restrained against axial movement relative to said component by a polygonal head 17 at the outer end thereof and a stop collar 18. The adjusting screw 16 also passes freely through a clearance hole 19 in the flange 9 of the sleeve 7, and its threaded portion is engaged within a tapped hole 20 in the disk component 1.

Arranged in quadrant relation to the adjusting screw 16, are two locking screws 21 (Figs. 1–4) which pass freely through other apertures 22 in the disk component 2 and which threadedly engage into tapped holes 23 in the flange 9 of the sleeve 7. Like the adjusting screw 16, the locking screws 21 are restrained against axial movement in the disk component 2 by the fixed polygonal heads 24 and stop collars 25 thereon; and the disk component 1 is spot recessed in its beveled side as at 26 to clear said screws when the two disk components are in mutual contact as in Fig. 1.

To adjust the sheave, the locking screws 21 are first backed off with the result that the wedge bushing 7 is axially shifted leftward in Fig. 1 and thereby permitted to contract circumferentially for easement of the disk component 1. With this preparation, the adjusting screw 16 is turned counterclockwise by means of a wrench or other tool applied to its head 17, the disk component 1 being thereby moved leftward i. e., in a direction away from the disk component 2 in a manner which will be readily understood from Fig. 3. After the desired adjustment is attained, the locking screws 21 are re-tightened incident to which the sleeve 7 is drawn rightward relative to the hub 3 of the disk component 2 and expanded circumferentially within the disk component 1 to thereafter hold the latter securely against accidental displacement from its newly adjusted position under the pull of the belt with which the sheave is used. While the preferred embodiment of this invention has been described in some detail, it will be obvious to one skilled in the art that various modifications may be made without departing from the invention as hereinafter claimed.

Having thus described my invention, I claim:

1. In an adjustable sheave, a bevel-faced disk component having a longitudinally-split tapered hub extending from the beveled side and bored to fit over a shaft; a mating belt-engaging disk component having a beveled face confronting the beveled face of the first disk component; a longitudinally split sleeve with a tapered bore engaged over the tapered hub of the first disk component, said sleeve having a cylindrical outer surface about which the mating disk component is slidingly engaged, and a circumferential flange at one end thereof disposed between the two disk components and accommodated in an axial recess in the inner face of the first disk component; and an adjusting screw constrained to rotation in the first disk component, said screw passing freely through a clearance aperture in the flange of the sleeve and threadedly engaging into the mating disk component.

2. An adjustable sheave according to claim 1, further including means for locking the disk components relative to each other and to the sleeve after adjustment.

3. An adjustable sheave according to claim 1, further including a spline lodged in a longitudinal slot in the sleeve and engaging registering longitudinal key ways respectively in the outer surface of the hub of the first mentioned disk component and in the bore of the mating disk component.

4. An adjustable sheave according to claim 1, further including at least one locking screw also restricted to rotation in the first mentioned disk component and threadedly engaged into the flange of the sleeve.

5. An adjustable sheave according to claim 1, further including at least one locking screw also restricted to rotation in the first mentioned disk component and threadedly engaged into the flange of the sleeve.

References Cited in the file of this patent

UNITED STATES PATENTS 2,611,278     Turnbull _____ Sept. 23, 1952
2,651,209     Williams _____ Sept. 8, 1953